United States Patent [19]

Kiesel

[11] Patent Number: 4,756,620
[45] Date of Patent: Jul. 12, 1988

[54] SIGNAL EVALUATION METHOD FOR A FIBER-OPTIC ROTATION SENSOR

[75] Inventor: Eberhard Kiesel, Edingen, Fed. Rep. of Germany

[73] Assignee: Teldix GmbH, Heidelberg, Fed. Rep. of Germany

[21] Appl. No.: 759,166

[22] Filed: Jul. 26, 1985

[30] Foreign Application Priority Data

Jul. 31, 1984 [DE] Fed. Rep. of Germany ....... 3428147

[51] Int. Cl.$^4$ ................................................ G01B 9/02
[52] U.S. Cl. .................................................... 356/350
[58] Field of Search ......................................... 356/350

[56] References Cited

U.S. PATENT DOCUMENTS

| | | |
|---|---|---|
| 4,219,276 | 8/1980 | Dorsman . |
| 4,299,490 | 11/1981 | Cahill et al. .................. 356/350 |
| 4,372,685 | 2/1983 | Ulrich . |
| 4,456,376 | 6/1984 | Carrington et al. . |
| 4,549,806 | 10/1985 | Martem et al. . |
| 4,569,593 | 3/1986 | Auch et al. . |
| 4,573,795 | 2/1986 | Auch et al. . |

FOREIGN PATENT DOCUMENTS 2058346  4/1981  United Kingdom ................ 356/350

OTHER PUBLICATIONS

Optics Letters, May 1980, vol. 5, No. 5, R. Ulrich, "Fiber-Optic Rotation Sensing with Low Drift", pp. 173–175.

Primary Examiner—Vincent P. McGraw
Assistant Examiner—S. A. Turner
Attorney, Agent, or Firm—Spencer & Frank

[57] ABSTRACT

A fiber-optic rotation sensor (fiber gyro) includes an optical transmission system into which a light signal is fed by means of a laser diode. The modulation is effected by means of a piezomodulator. The coupled-out signal is fed to a receiver diode and the amplified output signal of the latter is fed to a phase sensitive rectifier and to a peak-to-peak value measuring device. The measured peak-to-peak value represents the proportionality factor K through which the output signal of rectifier is divided. Therefore it is possible with this method to constantly measure the proportionality factor K, which changes under various influences and to thus eliminate errors in the determination of the Sagnac phase.

10 Claims, 1 Drawing Sheet

SIGNAL EVALUATION METHOD FOR A FIBER-OPTIC ROTATION SENSOR

BACKGROUND OF THE INVENTION

The invention relates to a signal evaluation method for a fiber-optic rotation sensor utilizing the Sagnac effect and employing two superposed light waves rotating in opposite directions in a circuit formed of a plurality of windings of a light conductive fiber and wherein a phase modulator modulates the rotating light with a frequency f and an evaluation unit determines the rotational velocity from the signal formed by the rotation sensor.

Known optical rotation rate sensors utilize, without exception, an interferometric measuring principle. In that case, the influence of rotation on two electromagnetic waves (light waves) rotating oppositely to one another on a closed transmission path is detected and measured with the aid of the characteristic interference structure.

To attain high detection sensitivity, a phase sensitive detection technique is generally utilized which requires additional phase modulation. A drawback of this method is that the signal present at the end contains a proportionality factor in addition to the actual information (trigonometric function which is proportional to the rate of rotation). Each variation of this preliminary factor influences the stability of the scale factor of the rotation sensor, for example as a result of the following effects:

variation of the power emitted by the electromagnetic transmitter (e.g. aging of the laser diode) and thus also variation of the partial powers resulting from power division;

variation of transmission attenuation, particularly a change in the alignment state between the individual optical components, aging of the light conductive fiber, etc.;

so-called polarization fading due to statistical polarization rotation during passage through the propagation medium and the subsequent polarizers;

all effects which influence interference capability of the light waves and thus visibility of the interference structure, particularly variation in the length of coherence;

variation of the dividing ratio at the primary beam divider; a constant dividing ratio can be realized only if certain parameters are maintained (e.g. polarization direction);

variation of detector efficiency; for optical light receivers, this efficiency is subject to a typical aging behavior and is additionally highly dependent on environmental conditions (temperature, voltage supply).

A method is therefore disclosed in German Offenlegungsschrift DE-OS No. 3,040,514 in which the output signal is evaluated at several frequencies in such a way that the preliminary factor is eliminated with the aid of quotient formation. However, this method is very complicated since it requires the use of additional phase sensitive rectifiers.

SUMMARY OF THE INVENTION

It is therefore the object of the invention to provide a signal evaluation method which, with the aid of a suitable, simple measuring method, compensates for the above-mentioned error sources while requiring little circuitry.

This is accomplished according to the invention in that a proportionality factor K contained in the signal is measured by means of a measuring device and is then utilized to compensate scale factor instabilities. In particular, this can be realized by employing the possibilities of dividing the Sagnac signal by the resulting measured value K or returning K in a control circuit so as to stabilize the light output.

Thus, the invention employs a measuring device which separately measures the proportionality factor by means of a suitable measuring method, preferably employing peak-to-peak value measurements, and utilizes the measured value either to divide the signal formed by the rotation sensor or to return it into the control circuit for light output stabilization. In this way, it is assured that any random influences on the measuring arrangement, which become noticeable in a change in the proportionality factor, do not cause falsification of the measured signal. Further features of the invention are contained in the dependent claims and in the description of an embodiment below.

BRIEF DESCRIPTION OF THE DRAWINGS

One embodiment of the invention will be explained in greater detail with reference to the drawings.

It is shown in.

DESCRIPTION OF THE PREFERRED EMBODIMENT

Figure 1:
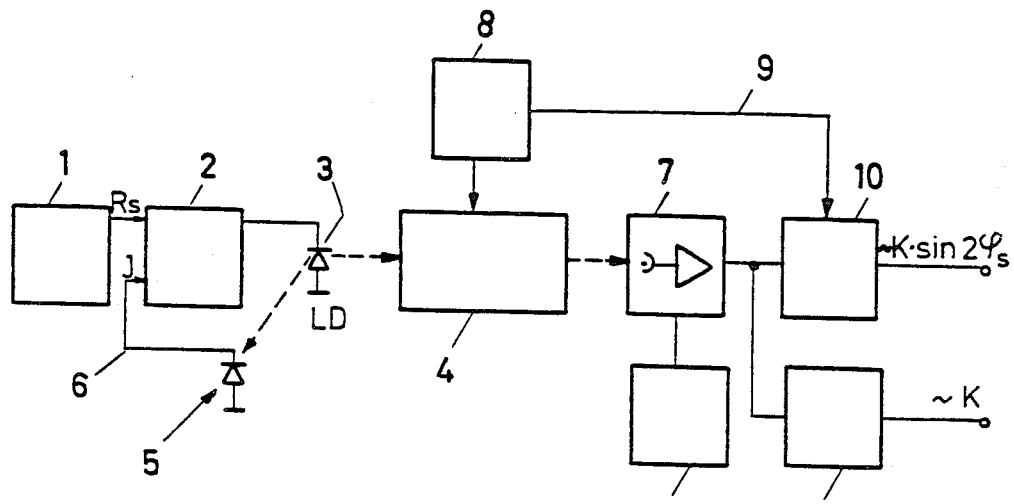
FIG. 1 which schematically illustrates the structure of a fiber-optic course generator.

As shown in FIG. 1, a laser supply device 2 furnishes the actuation signal to a laser diode 3 whose laser signal is coupled into an optical transmission system 4.

At the same time, the signal from this diode is conducted through a second optical output to a receiver diode 5 (monitor) and, via a return line 6, a corresponding signal voltage J is fed to the laser supply device. The light output of laser diode 3 is dependent upon a desired value $R_s$ which is formed by means of a reference value generator 1 and is compared with the signal voltage J.

The optical transmission system 4 is composed of a fiberoptic conductor and further optical components required in a fiber gyro (e.g. polarizers, depolarizers, modulators, etc.); the coupled-out signal is received by receiver diode 7. By means of a modulation device 8, the laser signal is phase modulated, a reference signal travels through line 9 to a phase sensitive rectifier 10. A stable supply voltage for receiver diode 7 is fed to this diode by voltage source 11. The amplified output signal of the receiver diode travels to phase sensitive rectifier 10 and to a device 12 for measuring the peak-to-peak value. By means of the peak-to-peak value measurement, a proportionality factor K is determined which is utilized for a division of the signal generated by phase sensitive rectifier 10. This causes an output signal to be formed which is a direct function of the Sagnac phase $\phi_s$ and is free of the transmission function containing the proportionality factor K. Consequently, a change in this factor K has no influence on the measuring result. A change is produced particularly as a result of the following effects:

variation of the power emitted by the electromagnetic transmitter (e.g. aging of the laser diode, instabilities of reference 1) and thus also variation of the partial powers resulting from power division;

variation of the transmission attenuation (e.g. change in the alignment state between the individual optical components of the transmission path, aging of the waveguide, changing environmental influences (e.g. vibration, etc.);

polarization fading due to the statistical polarization rotation during passage through the propagation medium and the subsequent polarizers;

variation of the gain in the first electronic amplifier stages;

variation of the dividing ratio at the primary beam divider;

variation of the detector efficiency; in optical light receivers, this detector efficiency is subject to a typical aging behavior and is additionally highly dependent on environmental conditions (temperature, voltage supply).

These effects, which have a more or less great influence on the proportionality factor and thus, in the past, have falsified the measuring results, are reliably eliminated by the introduction of peak-to-peak value measurements and, generally, by the introduction of a mesuring method for the determination of the proportionality factor.

Figure 2:
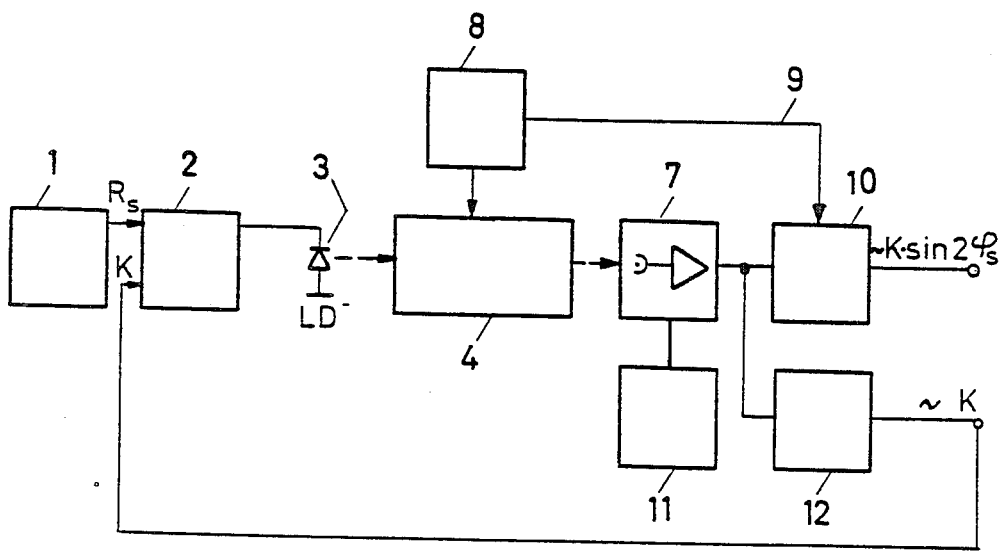
FIG. 2 which schematically illustrates the structure shown in FIG. 1 with changed control value feedback.

FIG. 2 shows an embodiment which is almost identical to FIG. 1. The significant distinguishing feature with respect to the structure shown in FIG. 1 is the changed regulation of the light output of laser diode 3. While in FIG. 1 the light output is sensed by means of receiver diode 5 and the latter produces a feedback signal J, in FIG. 2 the proportionality factor K, which is formed by peak-to-peak value measuring device 12, is the feedback signal which is compared with the desired value $R_s$. With this changed control circuit, the system is able to detect all of the above-described interferences and to keep the output signal constant.

A prerequisite for determining the proportionality factor is that the time curve of the detector signal pass through minimum and maximum values which are independent of the Sagnac phase and whose difference furnishes the desired peak-to-peak value signal. This requirement is met whenever a certain minimum phase modulation index is not exceeded downwardly.

The component of the detector signal containing the desired information has the following time curve:

$$i_D \sim K \cdot \cos^2(\phi_s + \Psi_m \sin \omega_m t) \quad (1)$$

where
$\phi_s$ = Sagnac phase
$\omega_m$ = modulation frequency
$\Psi_m$ = modulation index.

To be able to directly measure the proportionality factor K, the argument of the trigonometric function in (1) must go through zero (k·π, respectively) and through π/2((2+1)π/2, respectively) (k=whole number) at least once per modulation period. For $\Psi_m \geq \pi/2$, this requirement is always met, independently of $\phi_s$:

$$K = \frac{\text{Max}(i_D) - \text{Min}(i_D)}{2} \quad (2)$$

A further possible solution for determining the proportionality factor for any desired, particularly for small, modulation shifts ($\Psi_m \leq \pi/2$), furnishes the proportionality factor, during peak-to-peak value measurement, linked with a function f ($\Psi_m$, $\phi_s$):

$$i_D^{max} - i_D^{min} = K \cdot f(\Psi_m, \phi_s) \quad (3)$$

If the gyro output signal is divided by the peak-to-peak value, a new function F ($\Psi_m$, $\phi_s$) results:

$$F(\Psi_m, \phi_s) = \frac{K \cdot J_1(2\Psi_m) \cdot \sin 2\phi_s}{K \cdot f(\Psi_m, \phi_s)} \quad (4)$$

$$F(\Psi_m, \phi_s) = \frac{J_1(2\Psi_m) \cdot \sin 2\phi_s}{f(\Psi_m, \phi_s)}$$

where $J_1(2\Psi_m)$ = Bessel function of the first order

This function no longer contains the proportionality factor K affected by scale factor fluctuations and is unequivocally linked with the Sagnac phase. The precise curve can be calculated theoretically as a function of the degree of modulation employed and can be utilized for the (e.g. microprocessor controlled) signal evaluation. In particular, with this type of evaluation it is possible to utilize the optimum modulation index required in theory.

I claim:

1. Method for signal evaluation in a fiber-optic rotation sensor utilizing the Sagnac effect and employing two superposed light waves which rotate in opposite directions in a circuit formed of a plurality of windings of a light conductive fiber and wherein a phase modulator modulates the rotating light and the rate of rotation is determined by means of an evaluation unit which performs a phase sensitive rectification of the signal formed by the rotation sensor, characterized in that a peak-to-peak value signal proportional to a proportionality factor K contained in the signal formed by the rotation sensor is measured by means of a measuring device performing a peak-to-peak value measurement on the signal formed by the rotation sensor and is subsequently used to compensate scale factor instabilities.

2. Method according to claim 1, characterized in that the signal formed by the rotation sensor is divided by the measured peak-to-peak value signal.

3. Method according to claim 1, characterized in that the peak-to-peak value signal is fed back into a control circuit for stabilizing a light output to the sensor.

4. Method according to claim 1, characterized in that the modulation index is selected in such a manner that the equations $$\phi_s + \Psi_m \cdot \sin \omega_m t = 2n \cdot \pi/2$$

$$\phi_s + \Psi_m \cdot \sin \omega_m t = (2n+1) \cdot \pi/2$$

have temporal solutions for all values of $\phi_s$ wherein $\phi_s$ represents the Sagnac phase, $\omega_m$ represents the modulation frequency of the phase modulator, $\Psi_m$ represents the modulation index of the phase modulator and n represents a whole number.

5. Method according to claim 2, characterized in that, with any desired modulation index, the peak-to-peak value measurement furnishes a value K·f($\Psi_m$, $\phi_s$), wherein f($\Psi_m$, $\phi_s$) represents a dependency function of the rate of rotation of the superposed light waves, $\Psi_m$ represents the modulation index of the phase modulator and $\phi_s$ represents the Sagnac phase.

6. A method of evaluating a signal formed by a fiber-optic rotation sensor utilizing the Sagnac effect, the signal containing a signal proportionality factor K, comprising the steps of:

rotating two superimposed light waves in opposite directions in a circuit formed of a plurality of windings of a light conductive fiber;

modulating the rotating light with a phase modulator;

determining the rate of rotation of the rotating light, including performing a phase sensitive rectification of the signal formed by the fiber-optic rotation sensor;

performing a peak-to-peak value measurement on the signal formed by the fiber-optic rotation sensor to obtain a peak-to-peak value signal which is proportional to the factor K; and applying the peak-to-peak value signal to compensate instabilities in the factor K.

7. A method as in claim 6, wherein said step of applying includes the step of dividing the signal formed by the rotation sensor by the peak-to-peak value signal.

8. A method as in claim 6, wherein said step of applying includes the step of feeding the peak-to-peak value signal back into a control circuit for stabilizing a light output of the sensor.

9. A method as in claim 6, wherein said step of modulating includes the step of selecting a modulation index such that the equations $$\phi_s + \Psi_m \cdot \sin \omega_m t = 2n \cdot \pi/2$$

$$\phi_s + \Psi_m \cdot \sin \omega_m t = (2n+1) \cdot \pi/2$$

have temporal solutions for all values of $\phi_s$ wherein $\phi_s$ represents the Sagnac phase, $\omega_m$ represents the modulation frequency of the phase modulator, $\Psi_m$ represents the modulation index of the phase modulator and n represents a whole number.

10. A method as in claim 7, wherein said peak-to-peak value signal has a value $K \cdot f(\Psi_m, \phi_s)$, wherein $f(\Psi_m, \phi_s)$ represents a dependency function of the rate of rotation of the superposed light waves, $\omega_m$ represents the modulation index of the phase modulator and $\phi_s$ represents the Sagnac phase.

* * * * *